(12) United States Patent
Kolchin

(10) Patent No.: US 8,655,795 B1
(45) Date of Patent: Feb. 18, 2014

(54) SYSTEM AND METHOD FOR ESTABLISHING GEOGRAPHICAL COMMUNICATION AND PREDICTING MAIL DELIVERY USING MAILBOX-MOUNTED DEVICES

(71) Applicant: ZiK, Inc., Orange, CA (US)

(72) Inventor: Dmitriy Kolchin, Orange, CA (US)

(*) Notice: Subject to any disclaimer, the term of this patent is extended or adjusted under 35 U.S.C. 154(b) by 0 days.

(21) Appl. No.: 13/953,873

(22) Filed: Jul. 30, 2013

(51) Int. Cl.
G06Q 30/00 (2012.01)
G08B 13/14 (2006.01)

(52) U.S. Cl.
USPC .......................... 705/333; 705/341; 340/569

(58) Field of Classification Search
USPC .................... 705/333, 341; 340/569
See application file for complete search history.

(56) References Cited

U.S. PATENT DOCUMENTS

| | | | |
|---|---|---|---|
| 6,114,959 A | 9/2000 | Bennett | |
| 6,483,433 B2 * | 11/2002 | Moskowitz et al. | 340/568.1 |
| 6,519,629 B2 * | 2/2003 | Harvey et al. | 709/204 |
| 6,611,751 B2 | 8/2003 | Warren | |
| 6,831,558 B1 | 12/2004 | Andrew | |
| 6,958,701 B1 | 10/2005 | Storkamp et al. | |
| 7,118,034 B2 | 10/2006 | Baldassari et al. | |
| 7,299,125 B2 | 11/2007 | Marks et al. | |
| 7,437,414 B2 | 10/2008 | Dean | |
| 7,478,140 B2 | 1/2009 | King et al. | |
| 8,249,945 B2 | 8/2012 | Gillin et al. | |
| 8,299,923 B2 | 10/2012 | Hammoud | |
| 2001/0037271 A1 * | 11/2001 | Kubota | 705/34 |
| 2002/0024438 A1 * | 2/2002 | Roberson | 340/569 |
| 2003/0195699 A1 * | 10/2003 | Jones | 701/201 |
| 2004/0021571 A1 * | 2/2004 | Kim | 340/569 |
| 2005/0203807 A1 * | 9/2005 | Bezos et al. | 705/26 |
| 2005/0209922 A1 * | 9/2005 | Hofmeister | 705/14 |
| 2005/0216525 A1 * | 9/2005 | Wachholz-Prill et al. | 707/201 |
| 2005/0251330 A1 * | 11/2005 | Waterhouse et al. | 701/204 |
| 2005/0258980 A1 | 11/2005 | Conover | |
| 2007/0124241 A1 * | 5/2007 | Newton | 705/39 |
| 2007/0169176 A1 | 7/2007 | Cook et al. | |
| 2007/0181661 A1 | 8/2007 | Davis | |
| 2008/0040243 A1 * | 2/2008 | Chang et al. | 705/28 |
| 2009/0037196 A1 * | 2/2009 | Chang et al. | 705/1 |
| 2012/0030134 A1 | 2/2012 | Campbell et al. | |
| 2012/0047150 A1 * | 2/2012 | Spiegel | 707/748 |
| 2012/0281686 A1 | 11/2012 | Pollari | |
| 2013/0034273 A1 | 2/2013 | Mardirossian | |

FOREIGN PATENT DOCUMENTS

| | | |
|---|---|---|
| EP | 2443971 | 4/2012 |
| WO | 0171540 | 5/2002 |
| WO | WO03025704 | 3/2003 |
| WO | 2006044939 | 7/2006 |
| WO | 2012055417 | 5/2012 |

* cited by examiner

*Primary Examiner* — Kevin Flynn
(74) *Attorney, Agent, or Firm* — Law Office of Ilya Libenzon

(57) ABSTRACT

A system and related method are disclosed for establishing geographical communication and predicting mail delivery using mailbox-mounted devices adapted to detect delivery automatically and transmit that detection to associated electronic devices. Detection may be performed by various means including accelerometers, cameras, and magnetometers. The method includes maintaining a registry of mailbox-mounted devices, and passing communication between electronic devices used by owners of mailbox-mounted devices. The communication can include detection by the mailbox-mounted devices of mail delivery, and calculation of the postal carrier's probable route using that delivery detection.

17 Claims, 4 Drawing Sheets

SYSTEM AND METHOD FOR ESTABLISHING GEOGRAPHICAL COMMUNICATION AND PREDICTING MAIL DELIVERY USING MAILBOX-MOUNTED DEVICES

TECHNICAL FIELD

Embodiments disclosed herein relate generally to location-based communication and data gathering, and specifically to the use of mailbox-mounted devices as a basis for communication and data gathering.

BACKGROUND ART

Electronic technology has changed communication radically. The ubiquity of computers and mobile devices, and of Internet access, has made distance seem immaterial for many transactions. It is just as easy for two people on different continents to meet via video chat if they shared an office building. This new communicative freedom has famously enabled friends to stay in touch across thousands of miles with little effort, but has ironically done very little to change interactions between neighbors. The very freedom from geographical limitation that electronic systems offer creates a geographical blind spot, making it difficult to use electronic technology to contact somebody who lives across the street, absent some concerted sleuthing. There are times, however, when the ability to communicate with the other people in one's neighborhood is very useful, precisely because of the unique interests they share owing to their geographical proximity.

An important example of this problem may be seen in the experience of shipping and receiving parcels in the Information Age. It is now considered routine to be able to track the progress of packages online, and to predict their arrival within periods predicated, generally, on the quality of shipping for which the customer was willing to pay. One aspect of shipping, however, remains as unpredictable as ever: the actual moment of delivery. It is perhaps impossible to expect any shipping company to name the exact time of a delivery, owing to the complicated logistics of planning delivery routes. As a result, while the recipient can often predict delivery down to the day (or even half a day, in some cases), the recipient cannot generally predict the time of day the delivery will occur. The attempts that have thus far been made to rectify this have involved techniques to inform the recipient that delivery has occurred, but none so far have given the recipient the ability to know the time of delivery in advance.

There is thus a need for a system that enables neighbors to contact one another conveniently by electronic means, and particularly to track and communicate regarding the delivery of packages at the most local level.

SUMMARY OF THE EMBODIMENTS

A method is disclosed for communication using mailbox-mounted devices. The method involves maintaining, by a first electronic device, a registry of users of mailbox-mounted devices, verifying, by the first electronic device, that the mailbox-mounted device associated with at least one additional electronic device used by a user listed in the registry is operational, and communicating, by the first electronic device, with the at least one additional electronic device.

In a related set of embodiments, the method involves comparing postal carrier map data of the user of the at least one additional electronic device to the postal carrier map data of a user of the first electronic device, and communicating only if the postal carrier map data of the user of the at least one additional electronic device matches the postal carrier map data of the user of the first electronic device. An additional embodiment involves communicating with a plurality of devices having users with matching postal carrier map data. Another embodiment involves receiving, by the first electronic device, an instruction from the user of the first electronic device identifying postal carrier map data, retrieving, by the first electronic device, a list of mailbox-mounted devices matching the postal carrier map data, displaying, by the first electronic device, a representation of the list to the user of the first electronic device, receiving, by the first electronic device, a selection from the user of the first electronic device of an item from the list, and communicating with an electronic device used by a user associated with the selected mailbox-mounted device. Yet another embodiment involves displaying identifying information for the user of each mailbox-mounted device, and not displaying contact information associated with the user of each mailbox-mounted device.

An additional embodiment involves detection, by a mailbox-mounted device, of the delivery of mail, receiving, by the first electronic device, a signal indicating the delivery of mail from a mailbox-mounted device, calculating, by the first electronic device, the postal carrier's probable route using postal carrier map data, and transmitting, by the first electronic device, data describing the probable route to the at least one additional electronic device. In a related embodiment, the postal carrier map data is a zip code. In another related embodiment, the postal carrier map data is a carrier zone. In an additional related embodiment, the postal carrier map data is a carrier route. Another embodiment involves publishing, by the at least one electronic device, notification of the delivery of mail. Still another embodiment involves receiving, by the at least one electronic device, a message from a user of the at least one electronic device, transmitting, by the at least one electronic device, the message to the at least one mailbox-mounted device, and publishing, by the at least one mailbox-mounted device, the message. In another embodiment, publishing occurs only upon detection of the delivery of mail. In yet another embodiment publishing occurs only upon receiving an instruction from a postal carrier.

Also disclosed is a system for communication using mailbox-mounted devices. The system contains at least one mailbox-mounted device, adapted to detect mail delivery and send a signal indicating delivery over a network, at least one electronic device connected to the network, a device registry component, executing on the electronic device, and maintaining a registry of users of mailbox-mounted devices, and a communication component, executing on the electronic device, verifying that the mailbox-mounted device associated with at least one additional electronic device used by a user listed in the registry is operational, and establishing communication with the at least one additional electronic device.

In a related embodiment of the system, the at least one mailbox-mounted device further comprises an accelerometer. In another embodiment, the at least one mailbox-mounted device further comprises a camera. The at least one mailbox-mounted device further comprises a magnetometer, in another embodiment. According to an additional embodiment, the at least one mailbox-mounted device further comprises a display. Under another embodiment, the at least one mailbox-mounted device further comprises an audio output device. Under another embodiment, the at least one mailbox-mounted device further comprises a radio frequency transmitter, and the at least one electronic device further comprises a radio frequency receiver.

Other aspects, embodiments and features of the system and method will become apparent from the following detailed description when considered in conjunction with the accompanying figures. The accompanying figures are for schematic purposes and are not intended to be drawn to scale. In the figures, each identical or substantially similar component that is illustrated in various figures is represented by a single numeral or notation. For purposes of clarity, not every component is labeled in every figure. Nor is every component of each embodiment of the system and method shown where illustration is not necessary to allow those of ordinary skill in the art to understand the system and method.

BRIEF DESCRIPTION OF THE DRAWINGS

The preceding summary, as well as the following detailed description of the disclosed system and method, will be better understood when read in conjunction with the attached drawings. For the purpose of illustrating the system and method, presently preferred embodiments are shown in the drawings. It should be understood, however, that neither the system nor the method is limited to the precise arrangements and instrumentalities shown.

DETAILED DESCRIPTION OF SPECIFIC EMBODIMENTS

Figure 1:
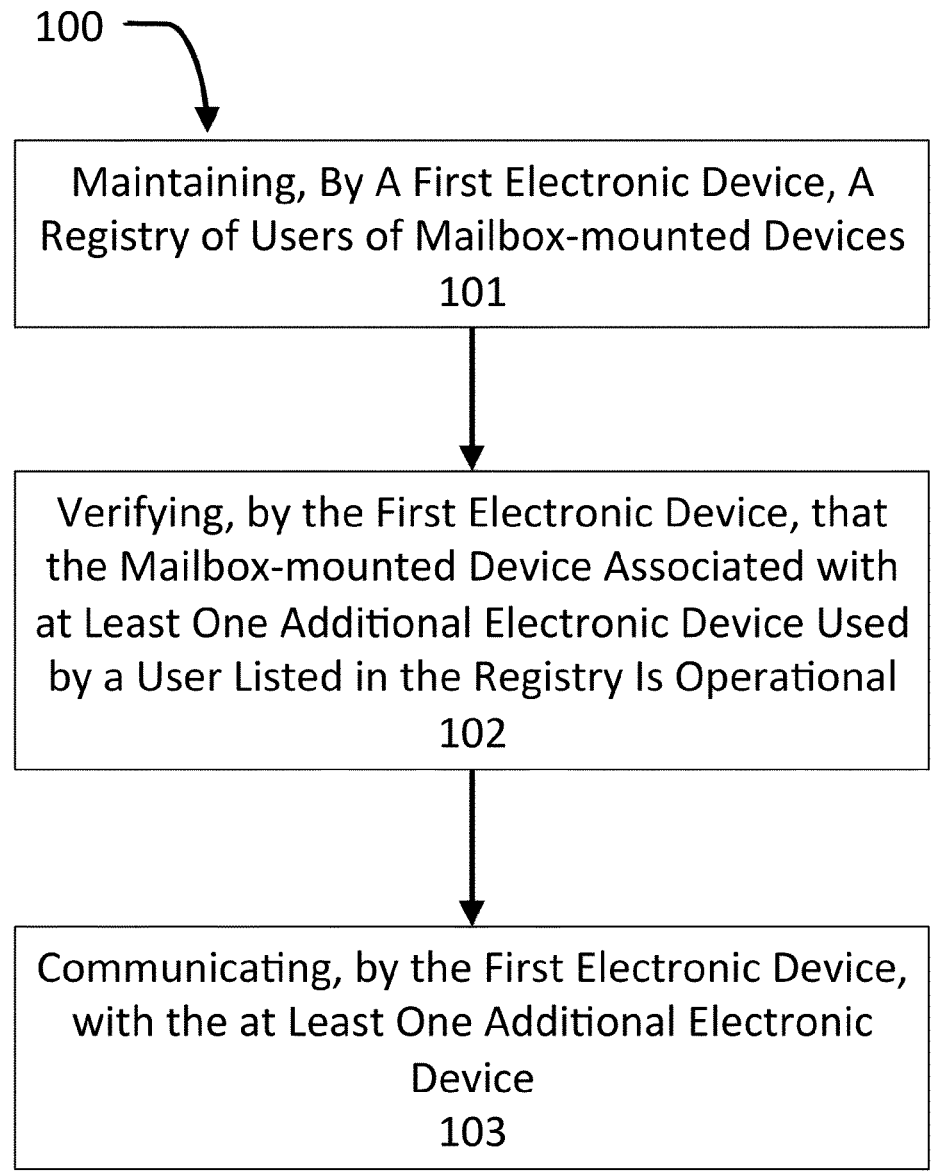
FIG. 1 is a flow chart illustrating one embodiment of the claimed method.

Definitions. As used in this description and the accompanying claims, the following terms shall have the meanings indicated, unless the context otherwise requires.

An "electronic device" is defined as including personal computers, laptops, tablets, smart phones, and any other electronic device capable of supporting an application as described herein.

A device or component is "coupled" to an electronic device if it is so related to that device that the product or means and the device may be operated together as one machine. In particular, a piece of electronic equipment is coupled to an electronic device if it is incorporated in the electronic device (e.g. a built-in camera on a smart phone), attached to the device by wires capable of propagating signals between the equipment and the device (e.g. a mouse connected to a personal computer by means of a wire plugged into one of the computer's ports), tethered to the device by wireless technology that replaces the ability of wires to propagate signals (e.g. a wireless BLUETOOTH® headset for a mobile phone), or related to the electronic device by shared membership in some network consisting of wireless and wired connections between multiple machines (e.g. a printer in an office that prints documents to computers belonging to that office, no matter where they are, so long as they and the printer can connect to the internet).

"Data entry devices" is a general term for all equipment coupled to an electronic device that may be used to enter data into that device. This definition includes, without limitation, keyboards, computer mice, touchscreens, digital cameras, digital video cameras, wireless antennas, Global Positioning System devices, audio input and output devices, gyroscopic orientation sensors, proximity sensors, compasses, scanners, specialized reading devices such as fingerprint or retinal scanners, and any hardware device capable of sensing electromagnetic radiation, electromagnetic fields, gravitational force, electromagnetic force, temperature, vibration, or pressure.

An electronic device's "manual data entry devices" is the set of all data entry devices coupled to the electronic device that permit the user to enter data into the electronic device using manual manipulation. Manual entry devices include without limitation keyboards, keypads, touchscreens, trackpads, computer mice, buttons, and other similar components.

An electronic device's "optical data entry devices" are components coupled to the electronic device that record images on an electronic image sensor, for instance using a digital camera, video camera, or scanner. Persons of ordinary skill in the art will be familiar with digital cameras that may be attached to computers to transfer images, cameras that operate while attached to computers (i.e. "webcams"), and the near-ubiquitous built-in cameras that come with mobile phones. Scanners that may be used with computers or other electronic devices have existed for decades, and are known to persons of ordinary skill in this invention's technical field. Furthermore, persons of ordinary skill in the art will be aware of cameras that can be attached to computers to transfer video that they have captured, digital video cameras that operate while attached to computers (i.e. "webcams"), and the digital cameras capable of capturing video that are built into many mobile phones.

An electronic device's "audio data entry devices" are devices that capture sound waves and vibrations and convert them into a digital signal that may be stored and played by an electronic device. Audio data entries include, without limitation, microphones.

An electronic device's "audio output devices" are devices that translate electronic signals into audio signals. Audio output devices include, without limitation, speakers.

An electronic device's "display devices" are devices coupled to the electronic device, by means of which the electronic device can display images. Display devices include without limitation monitors, screens, television devices, and projectors.

An electronic device's "navigation facility" is any facility coupled to the electronic device that enables the device accurately to calculate the device's location on the surface of the Earth. Navigation facilities can include a receiver configured to communicate with the Global Positioning System or with similar satellite networks, as well as any other system that mobile phones or other devices use to ascertain their location, for example by communicating with cell towers.

To "maintain" data in the memory of an electronic device means to store that data in that memory in a form convenient for retrieval as required by the algorithm at issue, and to retrieve, update, or delete the data as needed.

Figure 2:
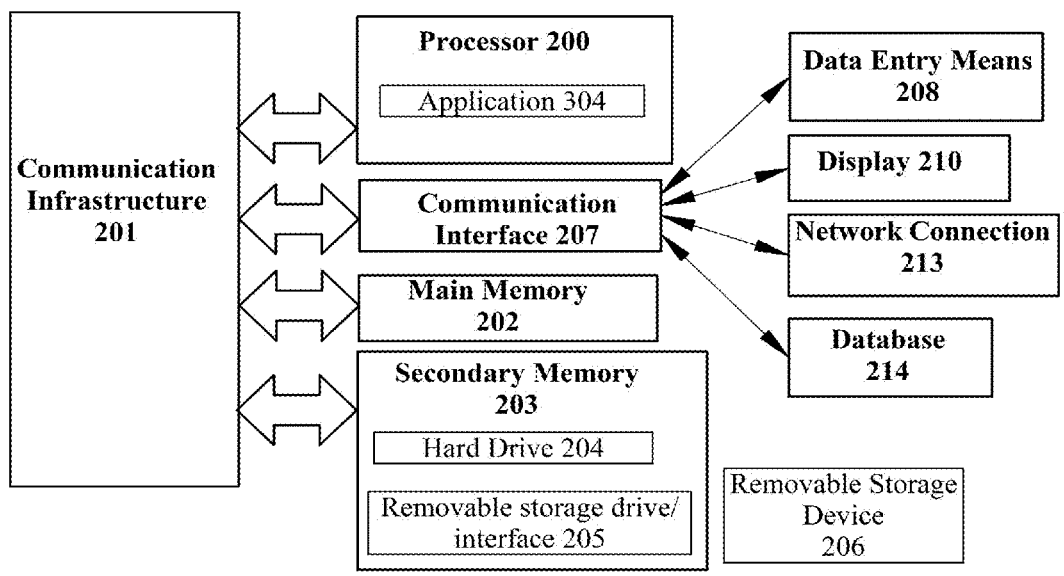
FIG. 2 is a schematic diagram depicting an example of an electronic device as described herein.

The system and method disclosed herein will be better understood in light of the following observations concerning the electronic devices that support the disclosed application, and concerning the nature of web applications in general. An exemplary electronic device is illustrated by FIG. 2. The processor 200 may be a special purpose or a general-purpose processor device. As will be appreciated by persons skilled in the relevant art, the processor device 200 may also be a single processor in a multi-core/multiprocessor system, such system operating alone, or in a cluster of computing devices operating in a cluster or server farm. The processor 200 is connected to a communication infrastructure 201, for example, a bus, message queue, network, or multi-core message-passing scheme.

The electronic device also includes a main memory 202, such as random access memory (RAM), and may also include a secondary memory 203. Secondary memory 203 may include, for example, a hard disk drive 204, a removable storage drive or interface 205, connected to a removable storage unit 206, or other similar means. As will be appreciated by persons skilled in the relevant art, a removable storage unit 206 includes a computer usable storage medium having stored therein computer software and/or data. Examples of additional means creating secondary memory 203 may include a program cartridge and cartridge interface (such as that found in video game devices), a removable memory chip (such as an EPROM, or PROM) and associated socket, and other removable storage units 206 and interfaces 205 which allow software and data to be transferred from the removable storage unit 206 to the computer system.

The electronic device may also include a communications interface 207. The communications interface 207 allows software and data to be transferred between the electronic device and external devices. The communications interface 207 may include a modem, a network interface (such as an Ethernet card), a communications port, a PCMCIA slot and card, or other means to couple the electronic device to external devices. Software and data transferred via the communications interface 207 may be in the form of signals, which may be electronic, electromagnetic, optical, or other signals capable of being received by the communications interface 207. These signals may be provided to the communications interface 207 via wire or cable, fiber optics, a phone line, a cellular phone link, and radio frequency link or other communications channels. The communications interface in the system embodiments discussed herein facilitates the coupling of the electronic device with data entry devices 208, the device's display 210, and network connections, whether wired or wireless 213. It should be noted that each of these means may be embedded in the device itself, attached via a port, or tethered using a wireless technology such as BLUE-TOOTH®.

Computer programs (also called computer control logic) are stored in main memory 202 and/or secondary memory 203. Computer programs may also be received via the communications interface 207. Such computer programs, when executed, enable the processor device 200 to implement the system embodiments discussed below. Accordingly, such computer programs represent controllers of the system. Where embodiments are implemented using software, the software may be stored in a computer program product and loaded into the electronic device using a removable storage drive or interface 205, a hard disk drive 204, or a communications interface 207.

The electronic device may also store data in database 212 accessible to the device. A database 212 is any structured collection of data. As used herein, databases can include "NoSQL" data stores, which store data in a few key-value structures such as arrays for rapid retrieval using a known set of keys (e.g. array indices). Another possibility is a relational database, which can divide the data stored into fields representing useful categories of data. As a result, a stored data record can be quickly retrieved using any known portion of the data that has been stored in that record by searching within that known datum's category within the database 212, and can be accessed by more complex queries, using languages such as Structured Query Language, which retrieve data based on limiting values passed as parameters and relationships between the data being retrieved. A database can be created in any digital memory.

Persons skilled in the relevant art will also be aware that while any device must necessarily comprise facilities to perform the functions of a processor 200, a communication infrastructure 201, at least a main memory 202, and usually a communications interface 207, not all devices will necessarily house these facilities separately. For instance, in some forms of electronic devices as defined above, processing 200 and memory 202 could be distributed through the same hardware device, as in a neural net, and thus the communications infrastructure 201 could be a property of the configuration of that particular hardware device. Many devices do practice a physical division of tasks as set forth above, however, and practitioners skilled in the art will understand the conceptual separation of tasks as applicable even where physical components are merged.

Figure 3:
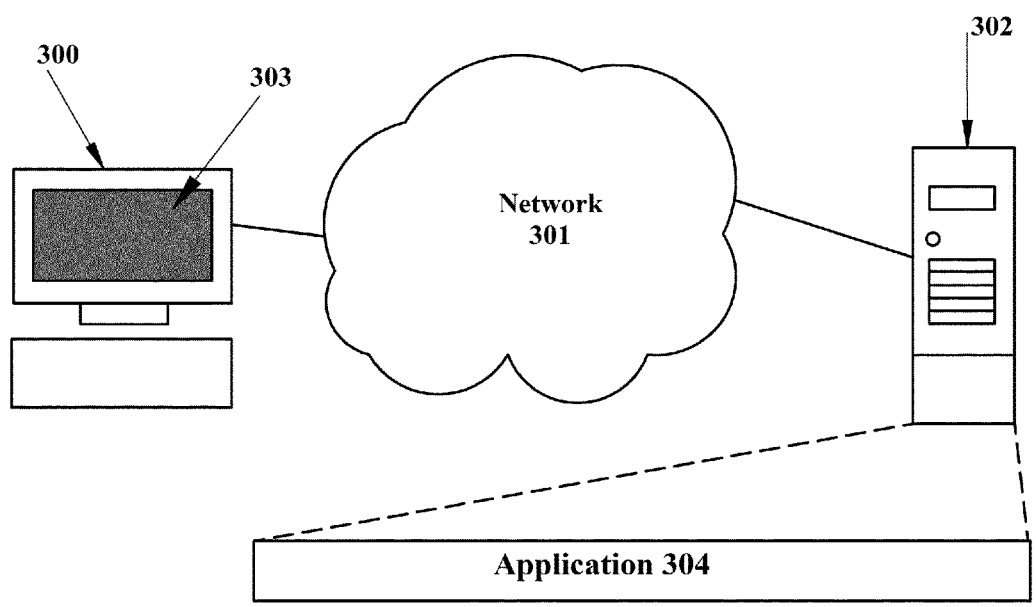
FIG. 3 is a schematic diagram of a network-based platform, as disclosed herein.

The systems may be deployed in a number of ways, including on a stand-alone electronic device, a set of electronic devices working together in a network, or a web application. Persons of ordinary skill in the art will recognize a web application as a particular kind of computer program system designed to function across a network, such as the Internet. A schematic illustration of a web application platform is provided in FIG. 3. Web application platforms typically include at least one client device 300, which is an electronic device as described above. The client device 300 connects via some form of network connection to a network 301, such as the Internet. The network 301 may be any arrangement that links together electronic devices 300, 302, and includes without limitation local and international wired networks including telephone, cable, and fiber-optic networks, wireless networks that exchange information using signals of electromagnetic radiation, including cellular communication and data networks, and any combination of those wired and wireless networks. Also connected to the network 301 is at least one server device 302, which is also an electronic device as described above. Of course, practitioners of ordinary skill in the relevant art will recognize that a web application can, and typically does, run on several server devices 302 and a vast and continuously changing population of client devices 300. Computer programs on both the client device 300 and the server device 302 configure both devices to perform the functions required of the web application 304. Web applications 304 can be designed so that the bulk of their processing tasks are accomplished by the server device 302, as configured to perform those tasks by its web application program, or alternatively by the client device 300. However, the web application must inherently involve some programming on each device.

Many electronic devices, as defined herein, come equipped with a specialized program, known as a web browser, which enables them to act as a client device 300 at least for the purposes of receiving and displaying data output by the server device 302 without any additional programming. Web browsers can also act as a platform to run so much of a web application as is being performed by the client device 300, and it is a common practice to write the portion of a web application calculated to run on the client device 300 to be operated entirely by a web browser. Such browser-executed programs are referred to herein as "client-side programs," and frequently are loaded onto the browser from the server 302 at the same time as the other content the server 302 sends to the browser. However, it is also possible to write programs that do not run on web browsers but still cause an electronic device to operate as a web application client 300. Thus, as a general matter, web applications 304 require some computer program configuration of both the client device (or devices) 300 and the server device 302 (or devices). The computer program that comprises the web application component on either electronic device's system FIG. 2 configures that device's processor 200 to perform the portion of the overall web application's functions that the programmer chooses to assign to that device. Persons of ordinary skill in the art will appreciate that the programming tasks assigned to one device may overlap with those assigned to another, in the interests of robustness, flexibility, or performance. Finally, although the best known example of a web application as used herein uses the kind of hypertext markup language protocol popularized by the World Wide Web, practitioners of ordinary skill in the art will be aware of other network communication protocols, such as File Transfer Protocol, that also support web applications as defined herein.

Embodiments of the disclosed system and method enable neighbors to establish communication networks based upon addresses. This permits neighbors to share information in times of crisis and inclement weather, and to function better as a community through enhanced communication. Aspects of the disclosed method and system also make it possible to predict the time that a delivery will take place at a particular house, and to receive notification when delivery has occurred.

Figure 4:
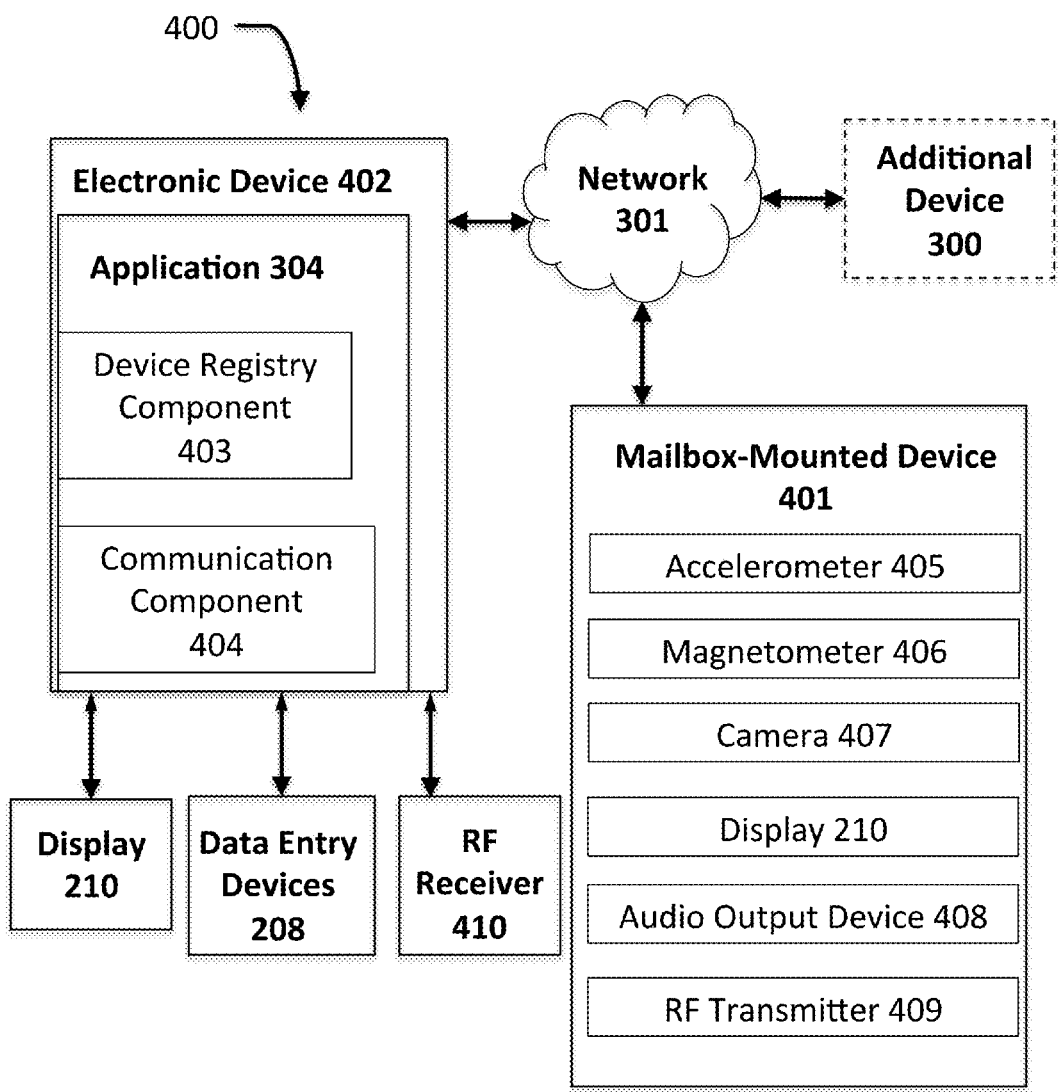
FIG. 4 is a block diagram depicting one embodiment of the disclosed system.

FIG. 4 illustrates some embodiments of the disclosed system 400. The first element is at least one mailbox-mounted device 401, adapted to detect mail delivery and send a signal indicating delivery over a network 301. The system 400 also includes at least one electronic device 402, which may be an electronic device as disclosed above in reference to FIGS. 2 and 3. The electronic device 402 is connected to the same network 301 as the mailbox-mounted device. The electronic device 402 is programmed or configured to perform the tasks of an application 304. The application 304 may be composed of one or more computer programs as described above in reference to FIGS. 2 and 3. The tasks the application 304 performs may be conceptually divided into a device registry component 403 and a communication component 404. The organization of tasks into those two components solely reflects a categorization of the tasks to be performed, and does not dictate the architecture of particular implementations of the system 400.

The first element of the system 400 is at least one mailbox-mounted device 401 adapted to detect mail delivery and send a signal indicating delivery over a network. The mailbox-mounted device 401 may be attached to the exterior of the mailbox (not shown). The mailbox-mounted device 401 may be attached to the interior of the mailbox. The mailbox-mounted device 401 may be attached to the door of the mailbox. In some embodiments, a portion of the mailbox-mounted device 401 is attached to the mailbox, while another portion thereof is not. The mailbox-mounted device 401 in some embodiments is an integral part of the mailbox; for instance, the mailbox-mounted device 401 and the mailbox may be manufactured together as a single unit.

In some embodiments, the mailbox-mounted device 401 has an element adapted to detect delivery by detecting the opening of the mailbox door. In some embodiments, the mailbox-mounted device 401 includes an accelerometer 405. The accelerometer 405 may be attached to the mailbox door so that it detects any movement of that door. In some embodiments, the accelerometer 405 measures the degree of acceleration. In some embodiments, the accelerometer 405 measures the duration of acceleration. In some embodiments, the accelerometer 405 measures the direction of acceleration. The mailbox-mounted device 401 in some embodiments includes a magnetometer 406. The magnetometer 406 in some embodiments senses the magnitude of magnetic fields. The magnetometer 406 in some embodiments senses the polarity of magnetic fields. In some embodiments, the magnetometer 406 detects the direction of local field lines of magnetic fields. In some embodiments, the magnetometer 406 is adapted to detect a change in direction with respect to the Earth's magnetic field, to indicate that the mailbox door has opened or closed. In some embodiments, the magnetometer 406 is adapted to detect a change in direction with respect to a magnetic field generated by a magnet mounted on the mailbox (not shown). In some embodiments, the magnetometer 406 is adapted to detect a change in strength in a magnetic field generated by a magnet mounted on the mailbox (not shown). In some embodiments, the magnetometer 406 is adapted to detect a change in polarity with respect to a magnetic field generated by a magnet mounted on the mailbox (not shown). In some embodiments, the mailbox-mounted device 401 has both an accelerometer 405 and a magnetometer 406.

In some embodiments, the mailbox-mounted device includes components that detect mail delivery by directly detecting the delivered mail. In some embodiments, the mailbox-mounted device further comprises a camera 407. The camera 407 may include a light source (not shown). The light source may be a flash. The light source may be an incandescent light bulb. The light source may be a florescent light bulb, such as a compact florescent light. The light source may be a light-emitting diode (LED). The light source may be bioluminescent. The light source may be phosphorescent. The light source may be chemiluminescent. The light source may be radioluminescent. The light source may be a device that transmits exterior light to the camera's field of vision by reflective means. In some embodiments, the camera 407 is mounted with its field of vision within the mailbox, so that for example the camera can detect the insertion of mail, or film the mail itself. In some embodiments, the camera 407 is mounted with its field of vision outside the mailbox; for instance, the camera 407 may be mounted so as to detect the presence of a postal carrier in the act of delivering the mail, or to film the postal carrier. The camera 407 may be stationary. The camera 407 may be mounted on a mobile turret. The camera 407 may be equipped with image compression technology. The image compression technology in some embodiments is a joint photographic experts group (JPEG) compression chip. In some embodiments, the camera 407 includes a memory chip for storage of images.

In some embodiments, the mailbox-mounted device 401 is adapted to communicate with persons in its immediate vicinity. In some embodiments, the mailbox-mounted device 401 further comprises a display 210. The display 210 may be a display as set forth above in reference to FIG. 2. The mailbox-mounted device 401 includes an audio output device 408, such as a speaker, in some embodiments. In some embodiments, the mailbox-mounted device 401 includes an LED light. The mailbox-mounted device 401 may be adapted to cause the LED light to signal various error states via blinking patterns; for example, one error state may be indicated by blinking on and off four times per second, while a second error state may be indicated by blinking on and off two times per second.

The mailbox-mounted device 401 may be coupled to data entry devices (not shown). For example, the mailbox-mounted device may have a button the postal carrier can push to receive a message stored in the mailbox-mounted device 401. The mailbox-mounted device 401 may have a keyboard to receive messages from a user to be published to another person. The mailbox-mounted device 401 may have a touchscreen to receive messages from a user to be published to another person. The mailbox-mounted device 401 may have a touch-pad to receive messages from a user to be published to another person. The mailbox-mounted device 401 may have a microphone to receive messages from a user to be published to another person.

The mailbox-mounted device 401 is adapted to signal its detection of mail delivery via the network 301. In some embodiments, the mailbox-mounted device 401 is an electronic device as set forth above in reference to FIGS. 2 and 3. The mailbox-mounted device 401 in some embodiments is configured by a computer program, as described above in reference to FIGS. 2 and 3, to transmit a signal over the network 301 to at least one electronic device. The mailbox-mounted device 401 in some embodiments is connected to the network via a wired connection. In some embodiments, the mailbox-mounted device 401 is connected to the network wirelessly. The mailbox-mounted device 401 may connect to the network by means of a "wi-fi" connection facility (not shown) coupled to the mailbox-mounted device 401. The wi-fi connection facility may be incorporated in the mailbox-mounted device 401. The wi-fi connection facility may be housed separately from the mailbox-mounted device 401; in particular, the wi-fi connection facility may be housed outside of the mailbox. The mailbox-mounted device 401 may connect to the wi-fi connection facility via an electrical wire. The mailbox-mounted device 401 may connect to the wi-fi connection facility via a wireless connection; for example, the mailbox-mounted device 401 and wi-fi connection facility may communicate via infra-red radiation. The mailbox-mounted device 401 may connect to the network by means of an antenna (not shown) coupled to the mailbox-mounted device 401. The antenna may be incorporated in the mailbox-mounted device 401. The antenna may be housed separately from the mailbox-mounted device 401; in particular, the antenna may be housed outside of the mailbox. The mailbox-mounted device 401 may connect to the antenna via an electrical wire. The mailbox-mounted device 401 may connect to the antenna via a wireless connection; for example, the mailbox-mounted device 401 and antenna may communicate via infrared radiation. In some embodiments, the at least one mailbox-mounted device 401 further comprises a radio frequency transmitter, and the at least one electronic device 402 further comprises a radio frequency receiver. More particularly, the mailbox-mounted device 401 may connect to the network 301 by means of a radio frequency ("RF") transmitter 409 coupled to the mailbox-mounted device 401, and an RF receiver 410 coupled to a nearby electronic device 402 that connects to the network 301. The RF transmitter 409 may be incorporated in the mailbox-mounted device 401. The RF transmitter 409 may be housed separately from the mailbox-mounted device 401; for example, the RF transmitter may be housed outside of the mailbox. The mailbox-mounted device 401 may connect to the RF transmitter 409 via an electrical wire. The mailbox-mounted device 401 may connect to the RF transmitter 409 via a wireless connection; for example, the mailbox-mounted device 401 and RF transmitter 409 may communicate via infrared radiation. The mailbox-mounted device 401 in some embodiments is also programmed to receive a signal, such as a "ping," designed to determine whether the mailbox-mounted device 401 is currently operating and connected to the network 301, and to send a signal in response. In some embodiments, the mailbox-mounted device 401 is further programmed to verify that it is located in a particular place. In some embodiments, the mailbox-mounted device 401 verifies its location using a navigation facility (not shown) that is coupled to the mailbox-mounted device 401.

The mailbox-mounted device 401 in some embodiments is battery-powered. The battery housing may be integrated with the mailbox-mounted device 401. The battery housing may be detachable from the mailbox-mounted device 401. The battery housing may be separate from the mailbox-mounted device 401; for instance, the battery housing may be connected to the mailbox-mounted device 401 by an electrical wire. In some embodiments, the mailbox-mounted device 401 is solar-powered. In some embodiments, the mailbox-mounted device 401 is powered by connection to alternating current (AC) wiring. In some embodiments, the mailbox-mounted device 401 is powered by a fuel cell. Some embodiments involve a combination of power sources; for instance, the mailbox mounted device 401 may be powered by a solar panel connected to a rechargeable battery pack. The mailbox-mounted device 401 may be powered by an AC connection with a backup battery. In some embodiments, the mailbox-mounted device 401 includes a power monitor. The mailbox-mounted device 401 may be adapted to transmit its power level, as detected by a power monitor, to an electronic device over the network 301. The mailbox-mounted device 401 in some embodiments is encased in a waterproof housing. In some embodiments, the mailbox-mounted device 401 is encased in a water-resistant housing.

The at least one electronic device 402 connects to the at least one mailbox-mounted device 401 via a network 301. The network 301 may be any network as described above in reference to FIG. 3. The electronic device 402 in some embodiments is a server as set forth above in reference to FIG. 3. In some embodiments, the electronic device 402 communicates with a server. In some embodiments, the electronic device 402 is a mobile device. In some embodiments, the electronic device 402 is a personal computer.

The device registry component 403 in some embodiments communicates with memory accessible to the electronic device 402. In some embodiments, the memory is a database (not shown) as introduced above in reference to FIG. 2. The communication component 404 in some embodiments utilizes network connections as set forth above in reference to FIGS. 2 and 3. In some embodiments, the communication component 404 communicates with the mailbox-mounted device by means of a direct interface, such as a Universal Serial Bus (USB) port or Thunderbolt. The communication component 404 may interact with the mailbox-mounted device in some embodiments by means of a local wireless communication protocol such as Bluetooth®.

Some embodiments of the disclosed system 400 involve the manipulation of postal carrier map data. Postal carrier map data as used herein may be any information that defines the geographical location of a mailbox. Postal carrier map data may include mailing addresses. Postal carrier map data may include neighborhoods. Postal carrier map data may include boroughs. Postal carrier map data may include municipalities. Postal carrier map data may include provinces. Postal carrier map data may include states. Postal carrier map data may include nations. Postal carrier map data may include zip codes. Postal carrier map data may include carrier route boundaries for parcel delivery services, such as the postal service or FedEx®. Postal carrier map data may include carrier routes for parcel delivery services.

A "postal carrier," as used herein, is the person, team of persons, or machine that physically delivers packages, including letters. Postal carriers may be mail carriers. Postal carriers may be employees of private delivery companies such as UPS®, DHL®, and FedEx®.

FIG. 1 illustrates some embodiments of the disclosed method 100. The method 100 includes maintaining, by a first electronic device, a registry of users of mailbox-mounted devices (101). In addition, the method 100 includes verifying, by the first electronic device, that the mailbox-mounted device associated with at least one additional electronic device used by a user listed in the registry is operational (102). The method 100 also includes communicating, by the first electronic device, with the at least one additional electronic device (103).

The method 100 includes maintaining, by a first electronic device, a registry of users of mailbox-mounted devices (101). The device registry component 403 may maintain the data in memory accessible to the electronic device 402. In some embodiments, the communication component 403 receives registration data from an electronic device operated by a user of one of the mailbox-mounted devices 401. In some embodiments, the registration data includes information identifying the user. In some embodiments, the registration data includes the address information of the user. In some embodiments, the communication component 404 verifies the address information of the user by receiving address information pertaining to the user from another electronic device connected to the network 301. The communication component 404 may verify the address information of the user by consulting an online phonebook maintained by a third-party server. In some embodiments, the communication component 404 may verify the address information of the user by receiving location data from the mailbox-mounted device 401, as generated by navigation facilities accessible to the mailbox-mounted device 401. The device registry component 403 may direct the communication component 404 to verify the address information upon initial registration. The device registry component 403 may direct the communication component 404 to verify the address information on a periodic basis.

In addition, the method 100 includes verifying, by the first electronic device, that the mailbox-mounted device associated with at least one additional electronic device used by a user listed in the registry is operational (102). In some embodiments, the communication component 404 sends a query to the mailbox-mounted device 401. A response to the query, in some embodiments, indicates that the mailbox-mounted device 401 is operational. In some embodiments, the query is a "ping." In some embodiments, a successful response the echo-response to a "ping." In some embodiments, a successful response conveys additional information verifying the identity of the mailbox-mounted device 401. In some embodiments, the response contains the current location of the mailbox-mounted device 401.

The method 100 also includes communicating, by the first electronic device, with the at least one additional electronic device (103). Communicating in some embodiments involves receiving a message from the user of the first electronic device 402, and transmitting the message to the at least one additional electronic device 300 for display to the user of the at least one additional electronic device 300. In some embodiments, communicating involves receiving a message from the user of the at least one additional electronic device 300 and displaying that message to the user of the first electronic device 402. In some embodiments, the communication component 404 communicates with the at least one additional electronic device 300 automatically. The communication component 404 may transmit messages using any protocol for sending data over networks. The communication component 404 may receive messages using any protocol for sending data over networks. The communication component 404 may use an electronic mail (email) protocol such as the simple mail transfer protocol (SMTP). The communication component 404 may use transfer control protocol/internet protocol (TCP/IP). The communication component 404 may use a text messaging protocol such as Internet relay chat (IRC). The communication component 404 may use voice over Internet protocol (VoIP). The communication component 404 may use hypertext transfer protocol (HTTP). The communication component 404 may use file transfer protocol (FTP). The communication component 404 may use a video streaming protocol. The communication component 404 may use an audio streaming protocol.

In some embodiments, communicating includes comparing postal carrier map data of the user of the at least one additional electronic device to the postal carrier map data of a user of the first electronic device and communicating only if the postal carrier map data of the user of the at least one additional electronic device matches the postal carrier map data of the user of the first electronic device. For instance, in some embodiments the communication component 404 only permits communication between the first electronic device and the at least one additional electronic device where the two devices are located in the same neighborhood. The communication component 404 may only permit communication where the two devices share a zip code. The communication component 404 may only permit communication where two devices share a postal carrier route. In some embodiments, the user of the first electronic device enters an instruction restricting communication to a given level of postal carrier map data.

In some embodiments, communicating includes communicating with a plurality of devices having users with matching postal carrier map data. For example, the communication component 404 in some devices is configured to communicate simultaneously with all electronic devices located in a particular geographical area defined by postal carrier map data; for the purposes herein, an electronic device is located where the mailbox-mounted device associated in the registry with the electronic device's user is located (thus, the electronic device could be physically outside the area in which it is "located"). The communication component 404 may communicate simultaneously with all electronic devices associated that share a neighborhood with the first electronic device. The communication component 404 may communicate simultaneously with all electronic devices that share a zip code with the first electronic device. The communication component 404 may communicate simultaneously with all electronic devices that share a postal carrier route with the first electronic device. In some embodiments, the communication component 404 communicates simultaneously with a subset of the electronic devices that devices share postal carrier map data with the first electronic device 402. For instance, the user of the first electronic device 402 may specify a contact list of persons in his or her neighborhood, and the communication device 404 may further restrict its communication to that list.

In some embodiments, communicating further comprises receiving, by the first electronic device, an instruction from the user of the first electronic device identifying postal carrier map data, retrieving, by the first electronic device, a list of mailbox-mounted devices matching the postal carrier map data, displaying, by the first electronic device, a representation of the list to the user of the first electronic device, receiving, by the first electronic device, a selection from the user of the first electronic device of an item from the list, and communicating with an electronic device used by a user associated with the selected mailbox-mounted device. The device registry component 403 in some embodiments receives a user instruction specifying particular postal carrier map data; for example, instruction may specify a particular zip code. The instruction may specify a particular zip code. The instruction may specify a particular address. The device registry component 403 may then retrieve a list of devices matching that particular postal carrier map data. The device registry component 403 may display a representation of that list to the user of the first electronic device 402 using a display 210 coupled to the first electronic device 402. Displaying the representation of the list in some embodiments further comprises displaying identifying information for the user of each mailbox-mounted device, and not displaying contact information associated with the user of each mailbox-mounted device. In some embodiments, displaying the representation of the list comprises displaying addresses. In some embodiments, displaying the representation of the list comprises displaying names. In some embodiments, the representation of the list displays email addresses. The user may select an item from the list by selecting a representation of that item using manual data entry devices. For example, if the device registry component 403 displays a list of addresses, the user may select one address from the list. Selection of one item from the list, in some embodiments, causes the communication component 404 to initiate communication with the electronic device associated with that list item.

In some embodiments, communicating with the at least one additional device further comprises detection, by a mailbox-mounted device, of the delivery of mail, receiving, by the first electronic device, a signal indicating the delivery of mail from a mailbox-mounted device, calculating, by the first electronic device, the postal carrier's probable route using postal carrier map data, and transmitting, by the first electronic device, data describing the probable route to the at least one additional electronic device. In some embodiments, the mailbox-mounted device 401 detects the delivery of mail by detecting the movement of the mailbox door, using devices described above in reference to FIG. 4. In some embodiments, the mailbox-mounted device 401 detects the delivered mail itself using devices described above in reference to FIG. 4. In some embodiments, the mailbox-mounted device 401 detects delivery by detecting the mail carrier using devices described above in reference to FIG. 4.

In some embodiments, the mailbox-mounted device 401, having detected the delivery of mail, transmits data indicating detection to the first electronic device 402 via the network 301. In some embodiments, the transmitted data is a true or false variable indicating delivery. In some embodiments, the transmitted data includes the time of delivery. In some embodiments, the transmitted data includes the identity of the mailbox-mounted device 401. In some embodiments, the transmitted data includes the location of the mailbox-mounted device 401. Subsequently, in some embodiments, the device registry component 403 matches the mailbox-mounted device to the registry. The device registry component 403 may locate the address of the mailbox-mounted device 401 in the registry, given sufficient information to identify the mailbox-mounted device 401. The device registry component 403 may locate the identity of the mailbox-mounted device using other information, such as the address of the mailbox-mounted device 401. The device registry component 403 may locate the identity of the user associated with the mailbox-mounted device 401. The device registry component 403 may determine the time of delivery by reference to the internal clock of the first electronic device 402. In some embodiments, the device registry component 403 receives delivery notification from a plurality of mailbox-mounted devices 401. The device registry component 403 may determine the time of delivery for each of the plurality of mailbox-mounted devices 401. In some embodiments, the device registry component 403 may determine the place of delivery for each of the plurality of mailbox-mounted devices 401; for instance, the device registry component 403 may determine the address of each of the mailbox-mounted devices 401.

In some embodiments, the device registry component 403 uses the delivery notification data, combined with postal carrier route data, to calculate a probable route of the postal carrier. In some embodiments, the postal carrier map data is the location of a mailbox-mounted device 401. In some embodiments, the postal carrier map data comprises the locations of a plurality of mailbox-mounted devices 401. In some embodiments, the postal carrier map data is a zip code. In some embodiments, the postal carrier map data is a carrier zone. In some embodiments, the postal carrier map data is a carrier route. In some embodiments, the postal carrier map data is a street map. In some embodiments, the postal carrier route data is the boundaries of a neighborhood.

The device registry component 403 in some embodiments uses the delivery notification data and the postal carrier map data to calculate the postal carrier's probable route. In some embodiments, the postal carrier map data is a map of the neighborhood, and calculating the route involves locating at least one delivery time and place on the map; where there are multiple delivery times and places, the calculation may involve connecting them into a path in the order in which the deliveries occurred. The device registry component 403 may then continue the path down available routes on the map. Where the postal carrier map data includes a carrier zone, the device registry component 403 may restrict the calculated path to the carrier zone. Where the postal carrier map includes a carrier route, the device registry component 403 may calculate the probable route by noting when each notified delivery occurred along the route, and estimating the time of future deliveries on that route. In some embodiments, the device registry component 403 maintains in memory accessible to the first electronic device each of the delivery notifications. In some embodiments, the device registry component 403 uses past notifications to estimate the route associated with a current delivery notification. In some embodiments, the device registry component matches a sequence of deliveries to a past delivery route to select a past route according to which to estimate the current route. In some embodiments, the communication component 404 sends this route information to an additional electronic device using communication techniques disclosed above in reference to FIG. 1, step 103. Some embodiments additionally involve publishing, by the at least one electronic device, notification of the delivery of mail.

Some embodiments of the method 400 further include receiving, by the at least one electronic device, a message from a user of the at least one electronic device, transmitting, by the at least one electronic device, the message to the at least one mailbox-mounted device, and publishing, by the at least one mailbox-mounted device, the message. In some embodiments, the communication component 404 receives the message via data entry devices. In some embodiments, the user enters the message via manual data entry devices; for instance, the user may type the message. The user may enter an audio message via audio data entry devices. The user may enter a video message via optical data entry devices. In some embodiments, the mailbox-mounted device 401 publishes the message using display means 210. In some embodiments, the mailbox-mounted device 401 publishes the message via an audio output device 408. Publishing in some embodiments occurs only upon detection of the delivery of mail. For instance, the user of the mailbox-mounted device 401 may leave instructions for the placement of packages, which will display upon the postal carrier opening the mailbox door. Detection of delivery of mail may be performed by any processes described above. In some embodiments, publishing occurs only upon receiving an instruction from a postal carrier. The instruction may be entered by data entry means coupled to the mailbox-mounted device 401. The instruction may be entered by pressing a button, such as a "play" button, attached to the mailbox-mounted device. The instruction may be entered via a touchscreen. The instruction may be entered via a touchpad. The instruction may be entered via a keyboard.

Some embodiments of the method 100 include receiving, by the first electronic device, data input by the user of the first electronic device rating the quality of service provided by a postal carrier. In some embodiments, the communication component 404 presents the user with a set of topics with regard to which the user may rate the postal carrier's service. In some embodiments, the communication component 404 presents the user with a set of topics with regard to which the user may comment on the postal carrier's service. Topics may include the state of the parcel when delivered. Topics may include the punctuality of delivery. Topics may include compliance with the postal carrier's employer's policies. Topics may include compliance with requests made by the user concerning the manner of delivery.

It will be understood that the system and method may be embodied in other specific forms without departing from the spirit or central characteristics thereof. The present examples and embodiments, therefore, are to be considered in all respects as illustrative and not restrictive, and the system method is not to be limited to the details given herein.

What is claimed is:

1. A method for communication using mailbox-mounted devices, comprising:
   maintaining, by a first electronic device, a registry of users of a plurality of mailbox-mounted devices;
   detecting, by at least one of the plurality of mailbox-mounted devices, a delivery of mail;
   receiving, from the at least one mailbox-mounted device and by the first electronic device, a signal indicating the detected delivery of mail;
   calculating, by the first electronic device, a probable postal carrier route including estimated times of future deliveries, based on postal carrier map data and based on the received signal;
   verifying, by the first electronic device, that a second mailbox-mounted device of the plurality of mailbox-mounted devices associated with at least one additional electronic device used by a user listed in the registry is operational; and
   transmitting, by the first electronic device, data describing the probable postal carrier route to the at least one additional electronic device.

2. A method according to claim 1, further comprising:
   receiving, by the first electronic device, an instruction from a user of the first electronic device identifying additional postal carrier map data;
   retrieving, by the first electronic device, a list of mailbox-mounted devices matching the identified additional postal carrier map data;
   displaying, by the first electronic device, a representation of the list to the user of the first electronic device;
   receiving, by the first electronic device, a selection from the user of the first electronic device of a mailbox-mounted device from the list; and
   communicating with an electronic device used by a user associated with the selected mailbox-mounted device.

3. A method according to claim 2, wherein displaying the representation of the list further comprises displaying identifying information for a user of each mailbox-mounted device on the list, and not displaying contact information associated with that user.

4. A method according to claim 1, wherein the postal carrier map data is a zip code.

5. A method according to claim 1, wherein the postal carrier map data is a carrier zone.

6. A method according to claim 1, wherein the postal carrier map data is a carrier route.

7. A method according to claim 1, further comprising publishing, by the first electronic device, notification of the delivery of mail.

8. A method according to claim 1, further comprising:
   receiving, by the at least one additional electronic device, a message from a user of the at least one additional electronic device;
   transmitting, by the at least one additional electronic device, the message to the second mailbox-mounted device; and
   publishing, by the second mailbox-mounted device, the message.

9. A method according to claim 8, wherein publishing occurs only upon detection of an additional delivery of mail by the second mailbox-mounted device.

10. A method according to claim 8, wherein publishing occurs only upon receiving an instruction from a postal carrier.

11. A system for communication using mailbox-mounted devices, the system comprising:
    at least one mailbox-mounted device, adapted to detect mail delivery and send a signal indicating delivery over a network;
    at least one electronic device connected to the network;
    a device registry component, executing on the electronic device, and configured to maintain a registry of users of a plurality of mailbox-mounted devices, to receive, from the at least one mailbox-mounted device, a signal indicating a detected delivery of mail, and to calculate a probable postal carrier route including estimated times of future deliveries based on postal carrier map data and based on the received signal; and
    a communication component, executing on the electronic device, configured to verify that a second mailbox-mounted device of the plurality of mailbox-mounted devices associated with at least one additional electronic device used by a user listed in the registry is operational and to transmit data describing the probable route to the at least one additional electronic device.

12. A system according to claim 11, wherein the at least one mailbox-mounted device further comprises an accelerometer.

13. A system according to claim 11, wherein the at least one mailbox-mounted device further comprises a camera.

14. A system according to claim 11, wherein the at least one mailbox-mounted device further comprises a magnetometer.

15. A system according to claim 11, wherein the at least one mailbox-mounted device further comprises a display.

16. A system according to claim 11, wherein the at least one mailbox-mounted device further comprises an audio output device.

17. A system according to claim 11, wherein the at least one mailbox-mounted device further comprises a radio frequency transmitter, and wherein the at least one electronic device further comprises a radio frequency receiver.

* * * * *